United States Patent Office 3,319,122
Patented May 9, 1967

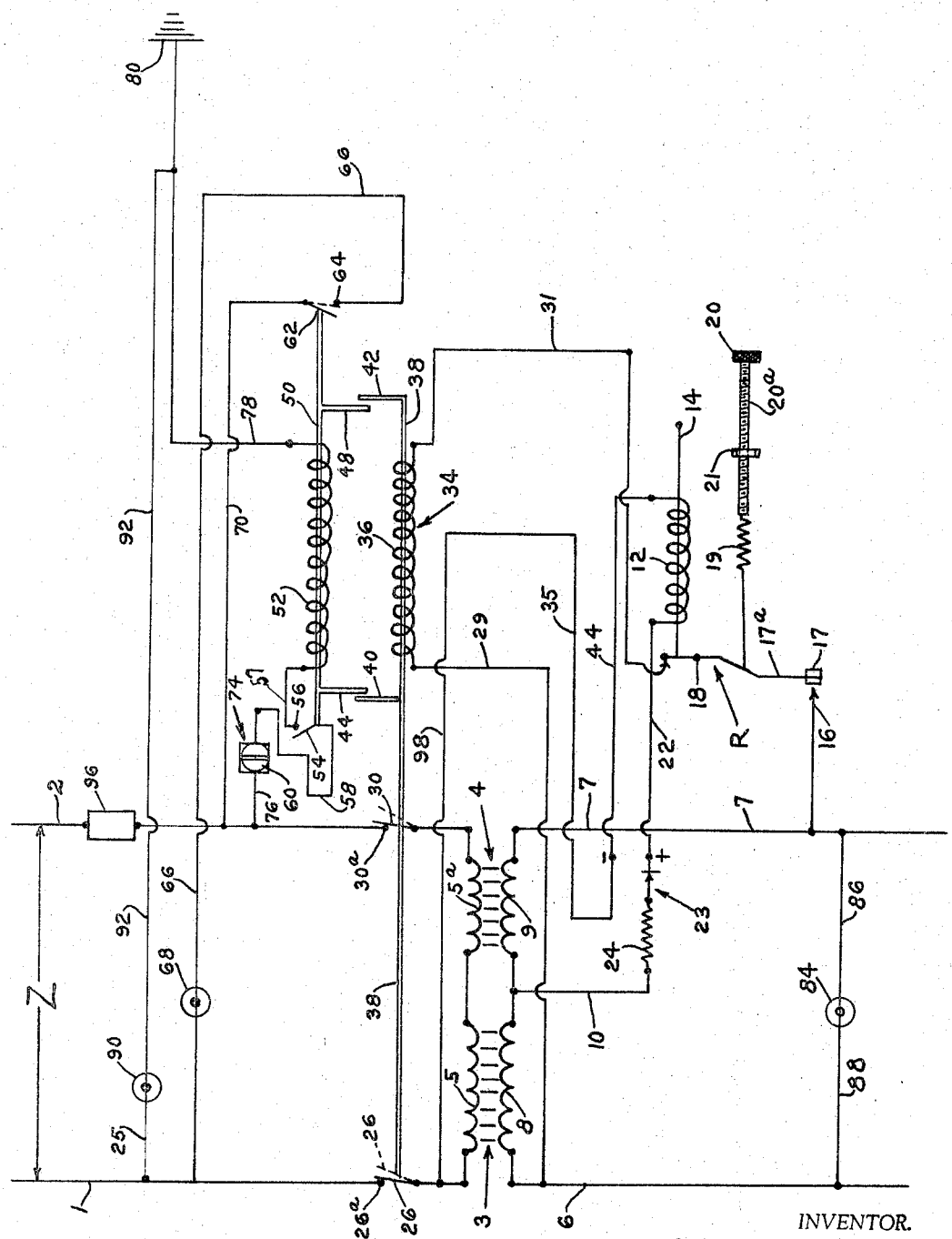
INVENTOR.
Joseph P. Marino
BY Harold E. Cole
Attorney

3,319,122
ELECTRICAL CIRCUIT CONTROL APPARATUS
Joseph P. Marino, Lincoln, R.I., assignor to Electronic Instruments Corp., Lincoln, R.I., a corporation of Rhode Island
Filed June 1, 1964, Ser. No. 371,629
6 Claims. (Cl. 317—18)

This invention relates to apparatus to control an electrical circuit.

Reference is made to my pending patent application Ser. No. 340,367, filing date Jan. 27, 1964.

One object of my invention is to provide improved apparatus that discontinues the electrical supply when an electrical fault to ground occurs in an electrical system resulting from interruption of the normal supply of electrical current in either load supply line to a tool or other power consuming means.

Another object is to provide an electrically operated signal, such as an electric light, as part of the apparatus that will signal an operator when the electrical current to a power consuming device or circuit is normal and also should a power consuming device or circuit develop an electrical current to a power consuming device or circuit.

A further object is to provide apparatus that when provided with an equipment ground terminal and that when connected to the usual electrical supply system, will provide a signal, such as an electric light that indicates to an operator whether or not said apparatus is properly installed and polarized with respect to the usual alternating current, electrical supply system connected thereto.

A still further object is to provide apparatus that, when connected to the usual electrical supply system in a manner voiding the polarity of said apparatus with respect to that of the usual electrical supply system and voiding utilization of ground terminal provided, will respond to an electrical fault resulting in the interruption of the normal flow of electrical current to a power consuming device or circuit.

Still another object is to provide a manually operated, reset control apparatus which will be operative only upon proper observance of apparatus polarity and the utilization of an equipment ground terminal.

The foregoing and other objects which will appear as the nature of the invention is better understood, may be accomplished by a construction, combination and operative arrangement of parts such as is disclosed by the drawing. The nature of the invention is such as to render it susceptible to various changes and modifications, and therefore, I am not to be limited to the construction disclosed by the drawing, nor to the particular arrangement described in the specification; but am entitled to all changes therefrom as fall within the scope of my claims.

The drawing is a diagrammatic view of my apparatus, including the electrical system, in normal position.

As illustrated, the usual electrical supply or primary leads or conductors 1 and 2 are connected to a source of electrical supply not shown. Leads 1 and 2 are respectively the ground and line sides of a single phase extending electrical system. An ordinary transformer 3 has a primary winding 5, and a saturable transformer 4 has a primary winding 5a that is connected in series with said primary winding 5. The core of transformer 4 will be moderately saturated over the range of applied voltages in supply leads or conductors 1 and 2 so that there will be a constant voltage output in secondary or load leads 6 and 7 which are connected to secondary windings 8 and 9 of said transformers 3 and 4 respectively.

Said secondary windings 8 and 9 are connected to a neutral center tap lead 10 and are poled so as to oppose each other, and saturable transformer 4 develops most of the secondary voltage.

When applied alternating voltage amplitude varies across supply leads 1 and 2, as may occur when loads are either supplied or removed from lines feeding said supply leads, the division of voltage between the transformers 3 and 4 changes with the latter taking proportionately less of the total. The resultant secondary voltage in load leads 6 and 7 becomes more nearly equal and voltage values in load leads 6 and 7 and center top 10 will remain substantially constant over an appreciable range of voltages applied to supply leads 1 and 2.

A variable sensitive relay apparatus R includes coil 12 with a plunger 14, stationary contact element 16 connected to load lead 7, a conductor arm 17a carrying a movable switch contact member 17. A pivotal element 18 is connected to said conductor arm 17a. Preferably included is a mechanical tension spring 19 connected to pivotal element 18, and an adjusting thumbscrew 20 attached to a screw-threaded member 20a connected to which is a screw-threaded, locking member 21. The degree of tension desired on said spring 19 is effected by adjusting said member 20a in this well-known arrangement.

Said coil 12 is connected by conductor 22 to the positive terminal of a solid state rectifier 23, to a fixed value resistor 24, to said center tap lead 10, to a conductor 35, to negative terminal of solid state rectifier 23, and to conductor 98 to load side of a switch member or arm 26 in primary lead 1. The latter also has a fixed switch contact member 26a. Said switch members 16 and 17 control the energizing current to a disconnecting coil 36, later described, that is supplied by a conductor 29 connected to load lead 6. Said conductor 2 has a switch element or arm 30 normally open, and there is a fixed, switch contact member 30a in supply lead 2. A conductor 31 connects with said conductor arm 17a and said coil 36.

Should an imbalance in potential occur in either load lead 6 or 7, due to an electrical fault occurring in power consuming means connected across said leads, current will flow through center tap lead 10 through resistor 24 through solid state rectifier 23. The positive component of the rectified alternating current will then flow through conductor 22 to coil 12, through conductor 35 to negative side of said rectifier 23, through conductor 98 to load side of a switch element 26 in primary lead 1.

The general circuitry utilizing a determined value of fixed resistor 24, solid state rectifier 23 and direct current coil 12 of sensitive relay apparatus R effects an absolute and positive reaction of sensitive relay apparatus R upon the slightest values of current flow in conductor 10 resulting from an imbalance in potential occurring at either load lead 6 or 7. It also effects an absolute and positive disconnecting of conductors serving the load side of switch members 30 and 26 in primary circuit leads 1 and 2.

The value of current passing through coil 12 is directly proportional to the amount of adjustment permitted to pivotal element 18. Tightening thumbscrew 20 increases tension through tension spring 19 to said pivotal element 18 resulting, therefore, in an increase in current values in coil 12 necessary to close contact elements 16 and 17. This permits energizing current to flow through conductor arm 17a, conductors 31 and 29 and to disconnecting relay coil 36, thereby opening the supply circuit in a positive manner.

The general circuitry, which provides positive, electromechanical, disconnecting apparatus 34, can effect disconnecting of supply leads 1 and 2. Presetting thereof is preferably made manually. This apparatus 34 has a said coil 36 with plunger 38, and said switch contact arms 26 and 30 are attached to said plunger 38, and are normally in closed position.

To provide a signal, such as an electric light, said coil plunger 38, which is movable with said coil 36, is fixedly attached to lever arms 40 and 42, and opening movement thereof opens said switch contact arms 26 and 30.

Attached to a plunger 50 are lever arms 44 and 48 which are moved by, and when, said lever arms 40 and 42 are moved. Movement of said lever arms 44 and 48 carry with them said plunger 50 fixed thereto and accompanied by a coil 52. A movable switch member or rim 54 is connected to plunger 50 and is normally spaced from a switch contact element 56 which connects through a conductor 57 with coil 52. A conductor 58 connects switch arm 54 with a reset impulse button 60, later described.

A movable switch contact arm 62 is fixed to said plunger 50 and is normally in open position and adjacent a fixed contact member 64 in a conductor 66. Closing movement of said plunger 50 brings said contact elements 62 and 64 together. Said conductor 66 is connected to the line side of switch contact element 26a in supply lead 1 and to a signal lamp 68 and to said contact member 64. Another conductor 70 extends from movable switch arm 62 to the line side of switch element 30a in supply lead 2.

Reset apparatus 74 includes a conductor 76 that is connected to line side of switch element 30a in supply lead 2. A said reset impulse button 60, connected to conductor 76, is normally open; but can be closed manually against spring pressure of the button which cannot be continually maintained physically in the closed position once the original application to close the circuit was initiated. Conductor 76 continues from said button 60 through conductor 58, switch members (closed) 54 and 56, conductor 57, to said coil 52, and from which a conductor 78 extends and continues to a ground 80. When energized said coil 52 draws said plunger 50 to open position thus opening said contacts 62 and 64. This also results in drawing said plunger 38 to closed position thus moving said switch members 26 and 30 into contact with contact elements 26a and 30a.

To provide a signal, such as an electric light, when the flow of electrical current to a power consuming device or circuit, connected across load leads 6 and 7 is normal, an indicator lamp 84 or other signal member is connected across load leads 6 and 7 through conductors 86 and 88. In normal operation, a potential difference will exist across load leads 6 and 7 and electrical current will flow through conductor 88 throuhg indicator lamp 84 and through conductor 86, and thus indicate power is being supplied from load leads 6 and 7 in a normal manner.

To provide a signal, such as an electric light, when the polarity of primary leads 1 and 2 are not in accord with the polarity of the usual alternating single phase electrical supply system to which it is connected, an indicator lamp 90 is connected from line side of switch contact element 26a in supply lead 1 to ground 80 through conductors 25 and 92.

To provide a signal, such as an electric light, when the polarity of primary leads 1 and 2 are not in accord with the polarity of the usual said electrical supply system to which it is connected, said non-polarizing indicator lamp 90 is connected from line side of switch contact element 26a to ground 80 through conductors 25 and 92.

In operation, assume first primary supply lead 1 is connected to the ground potential side of the usual main power circuit or electrical supply system and that therefore primary supply lead 2 will be connected to the line potential side of said supply system. Current flow in conductor 25 connected to primary supply lead 1 through indicator lamp 90 through conductor 92 and to ground 80 will be of zero value and indicator lamp 90 will be inoperative and will effectively indicate a condition of correct polarity existing between primary supply leads 1 and 2 with respect to that of the usual electrical supply system.

Conversely, assume supply lead 1 is connected to the line potential side of the usual electrical supply system and that therefor primary supply lead 2 will be connected to the ground potential side of said supply system. Current will flow in conductor 25, connected to primary supply lead 1, through indicator lamp 90 through conductor 92 and to ground 80 and effectively indicate a condition of non-polarity existing between primary supply leads 1 and 2 with respect to that of the usual electrical supply system.

A well-known magnetic overload disconnect switch 96 in lead 2 will automatically disconnect my control apparatus from the supply source should an overload condition exist or other abnormality occur.

In operation, electrical current is supplied through supply leads or wires 1 and 2 to transformers 3 and 4, thence to secondary or load leads 6 and 7 and to power consuming apparatus not shown. In the event of an electrical fault to ground developing, such as the current flowing through a metal body of a power consuming tool. An electrical current will also flow through the secondary center tap of said transformers 3 and 4 to center tap lead 10 thence to rectifier element 23 through conductor 22, to coil 12 and through conductor 35 to load side of switch element 26 in supply lead 1. This will cause movement of plunger 14 and pivotal element 18 thus bringing contacts 16 and 17 together. Current also flows from said load lead 7 to said contacts 16 and 17 and through conductor arm 17a, conductor 31 and through conductor 29 to thereby energize coil 36 and move plunger 38 to open position to thereby draw said switch contact arms 26 and 30 simultaneously to open position and opening the circuit.

In the aforesaid movement said plunger 38 also draws said lever arm 40 towards said lever arm 44, simultaneously carrying the latter and arms 42 and 48. This movement of arm 44 to closed position causes said switch contact 64 to contact switch arm 62 and also causes switch arm 54 to contact member 56. Said lever arm 48 serves to hold arm 42 and consequently arm 40 in open position since arm 42 is blocked from returning to closed position by arm 48 when said switch arm 62 is closed.

In this position current flows through lead 1 and conductor 66 to illuminate said warning lamp 68, and through said switch contacts 62 and 64, which were previously closed mechanically by said lever movement. The flow of current through said load leads 6 and 7 will thus cease, disconnecting the tool or power consuming equipment in which the electrical fault developed.

When said fault has been remedied or otherwise attended to, said reset button 60 is physically pressed to establish an electrical circuit through it and conductor 76, conductor 58, switch elements 54 and 56, conductor 57, coil 52 and conductor 78 to ground 80. The plunger 50 of coil 52 will then draw said levers 44 and 48 towards lever 40 thus moving said plunger 38, which causes establishment of the normal working circuit by moving contact arms 30 and 26 simultaneously into contact with contact elements 30a and 26a respectively, and also moving switch arm 62 from contact member 64.

What I claim is:

1. Electrical circuit control apparatus comprising two primary conductors and disconnecting apparatus connected in a main power circuit, two switches connected respectively to said primary conductors and normally closed and each having a movable contact arm, electrically operated actuating means adapted to actuate said disconnecting apparatus, conductor means connecting said actuating means to said main circuit, said disconnecting apparatus embodying a first coil, first lever means, a first plunger attached to said movable contact arms and to said first lever means and adapted to be actuated when said first coil is energized to thereby actuate said switch arms to open position, a second coil, conductor means connecting the latter to ground, second lever means so positioned with relation to said first lever means that actuation thereof actuates the latter, a second plunger attached to said second lever means and adapted to be actuated by said first plunger when said first coil is energized, a third switch normally open and having a stationary contact member and a movable contact arm attached to said second plunger and movable therewith to open position when said second coil is energized, conductor means connecting said third switch movable contact arm to a first of said primary conductors, other conductor means connecting said third switch stationary contact member to the other of said primary conductors, an electrically operated signal member connected to said latter conductor means, and a reset member connected to said first primary conductor and to said third switch movable arm and adapted upon actuation thereof to energize said second coil and actuate said second plunger to thereby move said third switch movable arm to open position.

2. Electrical circuit control apparatus as set forth in claim 1, and a fourth switch normally open having a movable contact member attached to said second plunger and movable therewith, a stationary contact member, a conductor connected to said second coil and to said fourth switch stationary member, and another conductor connected to said reset member and to said fourth switch movable member.

3. Electrical circuit control apparatus as set forth in claim 1, and another signal member at an intermediate point of one of said primary conductors and connected to said ground, said latter signal member being adapted to give a signal when there is a disparity of polarity between said main power circuit and one of said primary conductors.

4. Electrical circuit control apparatus as set forth in claim 1, and two secondary leads connected to said two primary conductors, another signal member, conductor means connected to the latter and to both of said secondary leads, said latter signal member being adapted to give a signal normally.

5. Electrical circuit control apparatus as set forth in claim 1, and a tap lead connected to said primary conductors, a resistor connected to said tap lead, a rectifier connected to said resistor, and conductor means connecting said rectifier to said actuating means.

6. Electrical circuit control apparatus as set forth in claim 2, and another signal member at an intermediate point of one of said primary conductors and connected to said ground, said latter signal member being adapted to give a signal when there is a disparity of polarity between said main power circuit and one of said primary conductors, and two secondary leads connected to said two primary conductors, another signal member, conductor means connected to the latter and both of said secondary leads, said latter signal member being adapted to give a signal normally.

References Cited by the Examiner
UNITED STATES PATENTS

| | | | |
|---|---|---|---|
| 2,844,765 | 7/1958 | Sosnoski | 317—18 |
| 2,999,189 | 9/1961 | Gerrard | 317—18 |
| 3,168,682 | 2/1965 | Moore et al. | 317—18 |
| 3,229,163 | 1/1966 | Rogers | 317—18 |

MILTON O. HIRSHFIELD, *Primary Examiner.*

R. V. LUPO, *Assistant Examiner.*